DOCUMENT REPRODUCING APPARATUS

Filed Jan. 9, 1962 4 Sheets-Sheet 1

INVENTOR.
HOWARD K. GRAVES
BY
ATTORNEY

June 30, 1964 H. K. GRAVES 3,139,013

DOCUMENT REPRODUCING APPARATUS

Filed Jan. 9, 1962 4 Sheets-Sheet 2

INVENTOR.
HOWARD K. GRAVES

BY

ATTORNEY

June 30, 1964 H. K. GRAVES 3,139,013

DOCUMENT REPRODUCING APPARATUS

Filed Jan. 9, 1962 4 Sheets-Sheet 3

INVENTOR.
HOWARD K. GRAVES

BY [signature]
ATTORNEY

DOCUMENT REPRODUCING APPARATUS

Filed Jan. 9, 1962 4 Sheets-Sheet 4

INVENTOR.
HOWARD K. GRAVES
BY
ATTORNEY

United States Patent Office 3,139,013
Patented June 30, 1964

3,139,013

DOCUMENT REPRODUCING APPARATUS

Howard K. Graves, Fairport, N.Y., assignor to Xerox Corporation, Rochester, N.Y., a corporation of New York, and Bell & Howell Company, a corporation of Illinois Filed Jan. 9, 1962, Ser. No. 165,170
1 Claim. (Cl. 95—1.7)

This invention relates to xerography and particularly to an improved projection apparatus for a xerographic reproducing apparatus. More specifically, the invention relates to improved projection apparatus for an automatic xerographic reproducing apparatus to affect synchronous movement between an original and a xerographic plate onto which the image of an original is projected.

In the process of xerography, for example, as disclosed in Carlson Patent 2,297,691, issued October 6, 1942, xerographic plate, comprising a layer of photoconductive insulating material on a conductive backing, is given a uniform electric charge over its surface and is then exposed to the subject member to be reproduced, usually by convention projection techniques. This exposure discharges the plate areas in accordance with the radiation intensity that reaches them, and thereby creates an electrostatic latent image on or in the photoconductive layer.

Development of the latent image is effected with an electrostatically charged, finely divided material such as an electroscopic powder that is brought into surface contact with the photoconductive layer and is held thereon electrostatically in a pattern corresponding to the electrostatic latent image. Thereafter, the developed xerographic powder image is usually transferred to a support surface to which it may be fixed by any suitable means.

In automatic machines which reproduce copies of originals by xerography, it is usual to employ a xerographic plate which is moved at constant rate and to project an image of the original through a system of optics onto the xerographic plate. Because the plate is constantly moving, synchronous movement of the projected image relative to the plate is necessary to prevent image blurring and in general to effect quality reproduction of high resolution.

Synchronization in prior art automatic xerographic machines has heretofore been achieved by means of relatively complex mechanisms, some of which move the original on a carrier at a proportional rate to the rate of plate movement and others in which the original is stationary and the optics scan the original in timed relation to the movement of the plate.

In each of the prior art devices, the desired synchronization of the xerographic plate and the scanning of an original has been achieved by relatively complex and expensive mechanisms.

The principal object of the invention is to improve projection apparatus by which synchronous movement between a projected igame of original copy on a copy carrier and a xerographic plate onto which the image is projected is achieved in a copy duplicator more efficiently than by apparatus employed heretofore.

Another object of the invention is to improve projection apparatus for use in a xerographic reproducing apparatus by which synchronous movement between a projected image of an original on a copy carrier and a xerographic plate is effected more simply and at a lower cost of fabrication than with apparatus employed heretofore.

These and other objects of the invention are achieved in the preferred embodiment of the invention by means of a xerographic plate and copy carrier both cylindrical in form which are mounted in juxtaposition for rotation about the same axis for rotation at identical rates. By means of a folded optical system, the image of an original carried on the periphery of the moving copy carrier is projected onto the periphery of the xerographic plate.

A preferred embodiment of the invention is illustrated in the accompanying drawings in which.

Figure 1:
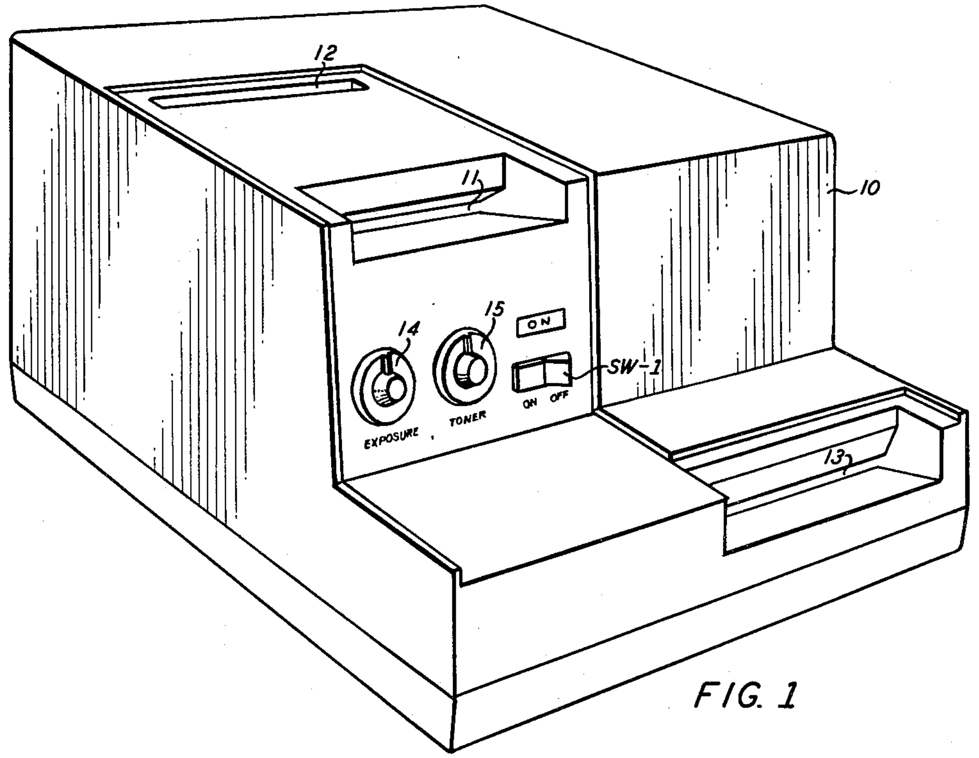
FIG. 1 is a left-hand perspective view of a xerographic reproducing apparatus incorporating the projection apparatus of the invention.

Referring to the drawings there is illustrated in FIG. 1 a xerographic copy duplicator which is relatively compact and conveniently can be supported on a desk top. The duplicator shown in FIG. 1 includes a cabinet 10 in which the repreduction components are housed, and which includes an entrance slot 11 into which originals to be reproduced are inserted and an exit slot 12 from which the originals emerge. A support surface such as paper, on which reproduction of copy is formed is stored external of the apparatus, and for reproduction purposes is inserted into and also emerges from slot 13. Also located on the front of the apparatus as viewed in FIG. 1 are an "on-off" switch SW-1, an exposure control dial 14 and a toner dispensing control dial 15 which are described below. The upper portion of cabinet 10 is removable for the purpose of accessibility to the apparatus for service or maintenance.

For a general understanding of the xerographic processing system in which the invention is incorporated, reference is had to FIGS. 2 through 6, inclusive, in which the various system components are illustrated. As in all xerographic systems based on the concept disclosed in the above-cited Carlson patent, a radiation image of copy to be reproduced is projected onto the sensitized surface of a xerographic plate to form an electrostatic latent image thereon. Thereafter, the latent image is developed with an oppositely charged developing material to form a xerographic powder image, corresponding to the electrostatic latent image on the plate surface. The powder image is then transferred to a support surface to which it may be fused by any suitable form of fusing device, whereby the powder image is caused permanently to adhere to the support surface.

In the apparatus shown, an original is inserted into slot 11 until gripped by the bite of rollers 68 and 69 from which the original is then fed by a copy carrier in the form of a drum 19 which conveniently may be coated on its periphery with a traction material, such as rubber. Originals are supported by the moving carrier on its periphery to be moved past the optical axis of projection lens systems 20 that is illuminated by a pair of projection lamps LMP–1 and LMP–2. The image of the original is reflected by mirror 21 to mirror 22 and thence through an objective lens 23. From the lens the image is projected to mirror 24 and then to mirror 25 and then downwardly through a fixed slit aperture 28 onto the surafce of a xerographic plate in the form of drum 29 which is being constantly rotated by means described below. As an alternative to fixed slit aperture 28, apparatus to effect a variable slit aperture may be employed of a type disclosed in copending application, S.N. 837,173, filed August 31, 1959, in the name of Cerasani et al. With a variable slit aperture apparatus of the type disclosed in copending Cerasani application, the aperture width can be varied through a suitable linkage (not shown) operably connected to exposure control dial 14.

The xerographic drum surface comprises a layer of photoconductive material on a conductive backing that is sensitized prior to exposure by means of a corona generating device 30 which may be of the type disclosed in Vyverberg Patent 2,836,725, secured to a suitable frame element of the machine and connected to an electrical circuit described hereinafter.

The exposure of the xerographic drum to the radiation image discharges the photoconductive layer in the areas struck by radiation, whereby there remains on the drum a latent electrostatic image in image configuration corresponding to the radiation image projected from the original. As the drum surface continues its movement, the electrostatic latent image passes developing apparatus 31.

In the developing apparatus 31, developing material 32 is conveyed by a driven conveyor 33 and is released onto chute 34 wherefrom it cascades down over the drum surface. Toner component 35 of the developer material, that is consumed in developing, is stored in dispenser 36, which may be of a type disclosed in copending application S.N. 776,976, filed November 28, 1958, in the name of R. A. Hunt, and from which toner is dispensed by operation of dial 15 to be described below.

After developing, the xerographic powder image passes a lamp LMP–3 and any residual charges on the nonimage areas of the drum surface are completely discharged. Thereafter, the powder image is electrostatically transferred by means of a second corona generating device 42 similar to corona charging device 30, to a support surface 41, illustrated in FIG. 3 in transfer relation.

The support surface to which the powder image is transferred may be of any convenient type, such as paper, and is inserted into slot 13 of the cabinet descending between the belts of conveyors 45 and 48 at the front of the machine. Thereafter, in proper sequence as described below, the support surface is moved between endless conveyors 45 and 48, around guide roll 46 to be directed into surface contact with the xerographic drum 29 in the immediate vicinity of transfer corona generating device 42 and in proper registration with the powder image on the drum surface. After transfer, the support surface is separated from the drum surface by convenient means such as a suitable doctor blade 47. The support surface after separation is thereafter forwarded by means of endless conveyor 48 past a suitable fusing apparatus 49, whereby the powder image is permanently affixed to the support surface by means of heat generated from suitable resistance elements 51. Thereafter, the support surface bearing the reproduction is fed by roll 50 cooperating with endless conveyor 48 into slot 13 for removal by the operator from the apparatus.

After separation of the support surface from the xerographic drum, the xerographic drum surface is brushed clean by a cleaning brush 52, whereby any residual developing material on the drum is removed. Thereafter, the drum surface passes a fluorescent lamp LMP–4, whereat the drum surface in this region is completely flooded with light to remove any electrostatic charge that may remain thereon. Suitable light traps, such as intermediate frame plate 53, are provided in the system to prevent extraneous light from reaching the drum surface.

Original copy fed by the copy carrier drum and roll 69 in contact therewith or an original sandwiched therebetween passes the optical axis of the projection system 20 under transparent plate 54 and thereafter is engaged between endless conveyor 55 and the copy carrier drum 19 moving then between guide plate 57 and the endless conveyor 55. The original thereafter moves by means of pinch rolls 60 cooperating with endless conveyor 55 upward in the passage formed between the guide plate 57 and the conveyor to emerge from exit slot 12.

The xerographic drum 29 and copy carrier drum 19 are journaled for rotation on suitable bearings of the apparatus and are mounted side by side on the same shaft 58 and may be considered to be tandemly arranged if viewed in the direction of their axes. In the preferred form of the invention, both drums are coupled by means of pins 77 for rotation about the same shaft 58 as illustrated in the broken area of FIG. 6.

The drive to effect movement of the several driven components is furnished from motor M which rotates the cleaning brush through belt 61 at substantially the same speed as the motor and, through a suitable arrangement of reduction gears, generally designated 59, the motor M drives the other components of the apparatus at a reduced speed from pulley 65 through timing belt 62, and through the respective slip-clutch mechanisms where applicable.

The paper feed mechanism, which includes conveyors 45 and 48; the developing apparatus 31, and the toner dispenser 36 are driven by suitable slip-clutches of which only 63 and 64 are shown for the paper feed drive and toner dispenser drive, respectively. Each slip-clutch is controlled by a solenoid designated SOL–1, SOL–2 and SOL–3, to control the operation of the slip-clutches effecting operation of the paper feed drive, the toner dispenser drive and the developer mechanism, respectively. Each solenoid when energized disengage a ratchet to permit the clutch mechanism to connect the operable component of the clutch to the drive of the timing belt.

Figure 7:
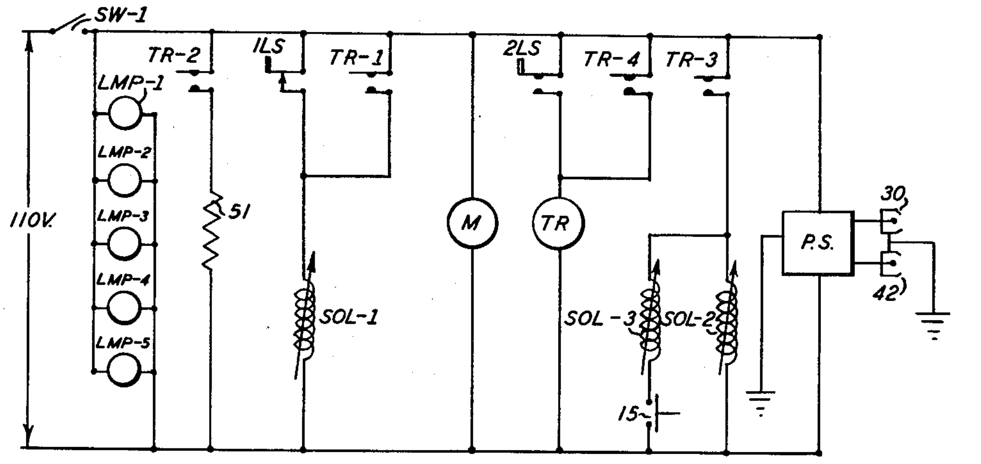
FIG. 7 is a schematic electrical wiring diagram of the xerographic apparatus.
Figure 2:
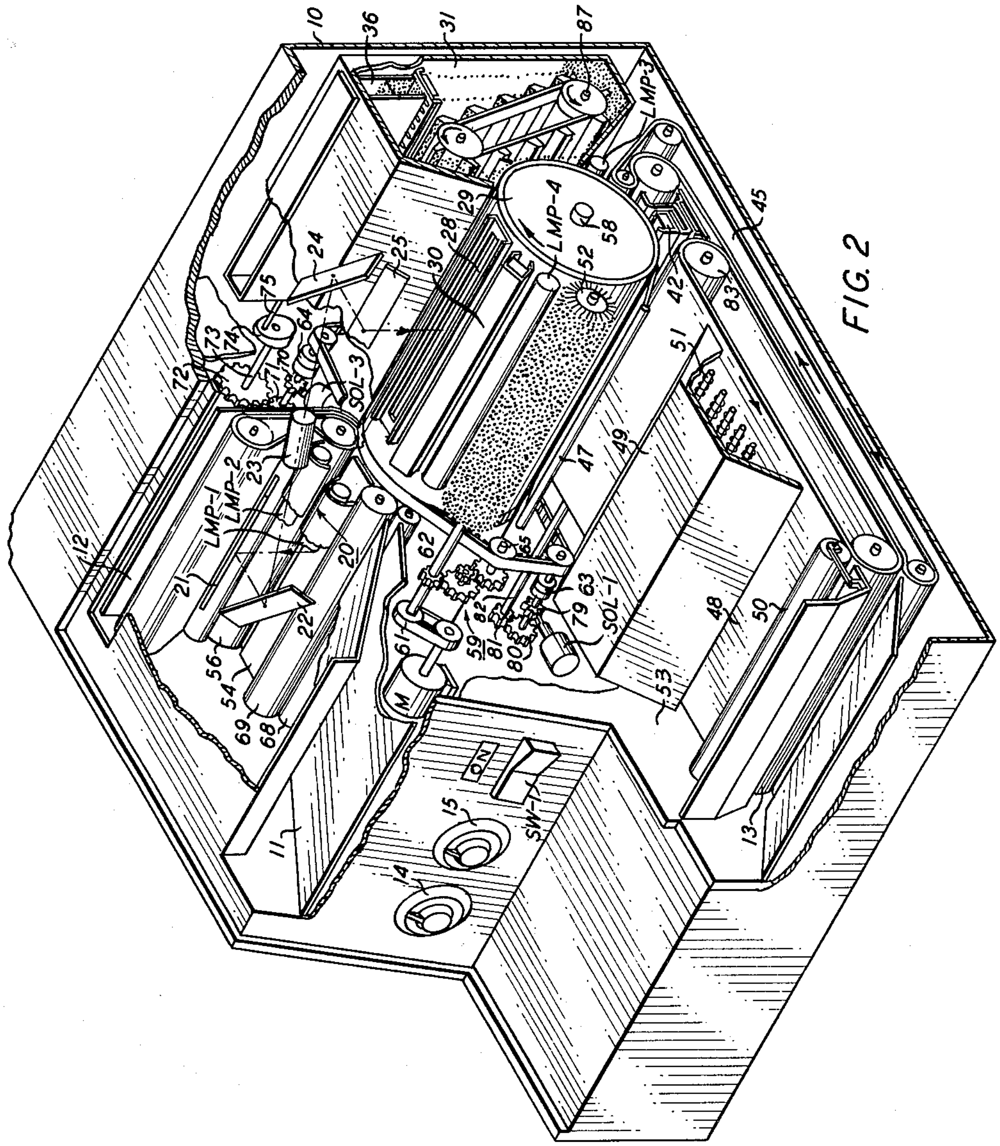
FIG. 2 is a right-hand perspective view of the xerographic apparatus with the outer cabinet and other structure broken away to show the arrangement of the xerographic machine elements.
Figure 3:
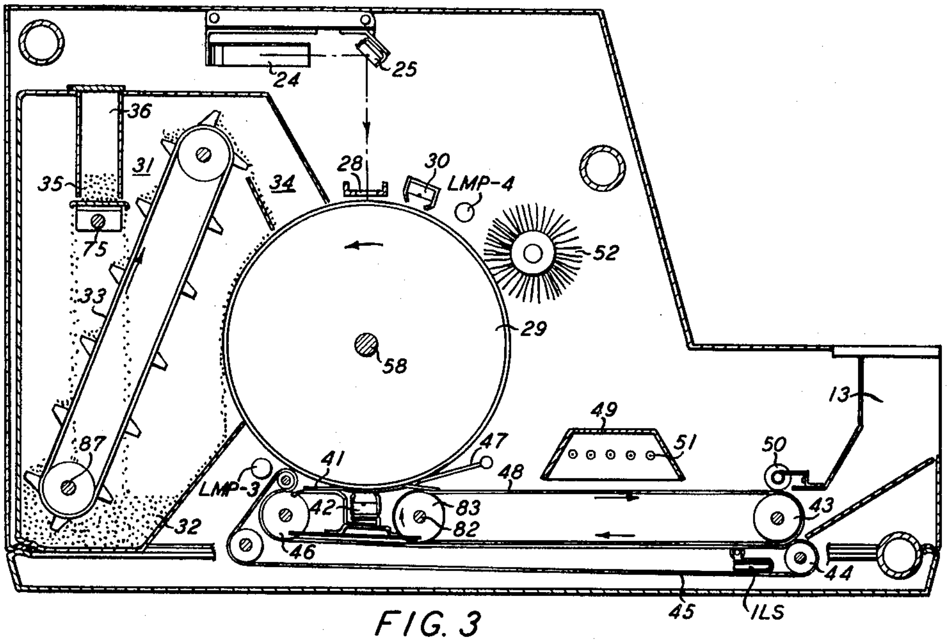
FIG. 3 is a left-hand elevation view of the xerographic portion of the apparatus.
Figure 4:
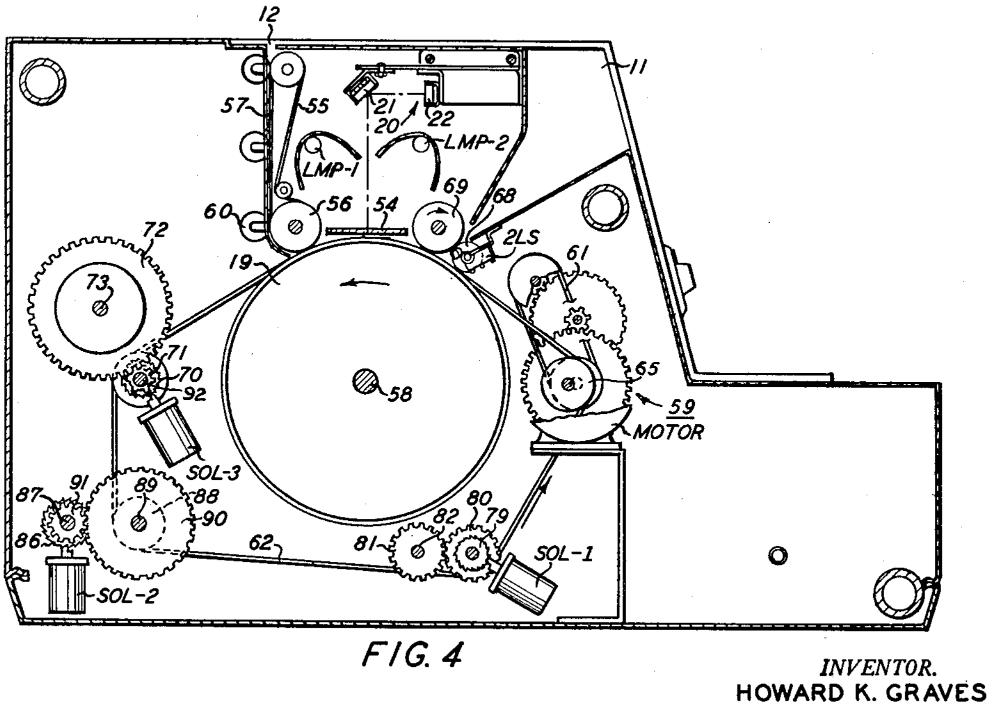
FIG. 4 is a left-hand elevation view of the copy carrier portion of the apparatus.
Figure 5:
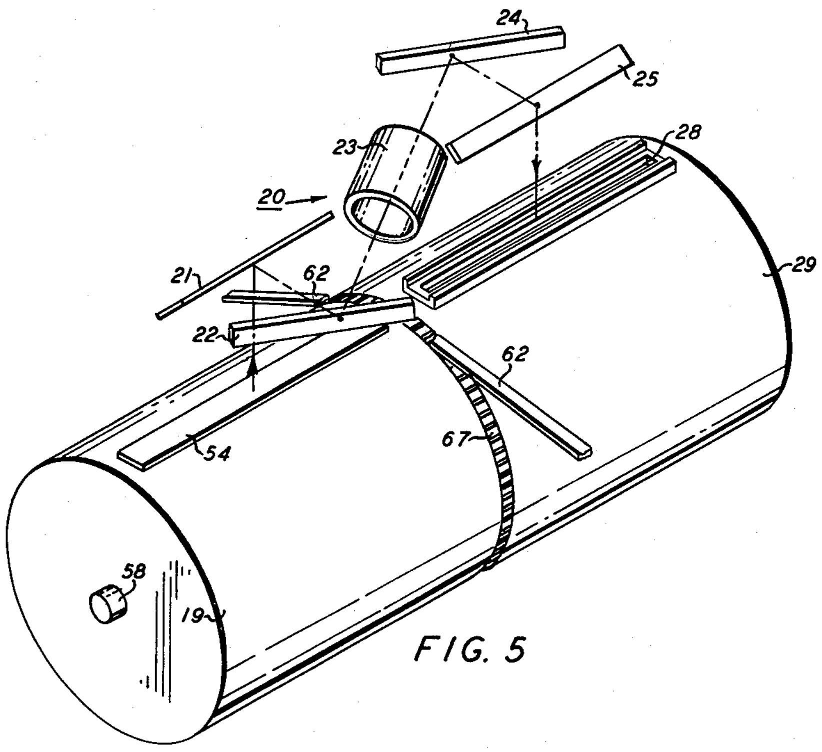
FIG. 5 is an isometric view of the optical system removed from the apparatus.
Figure 6:
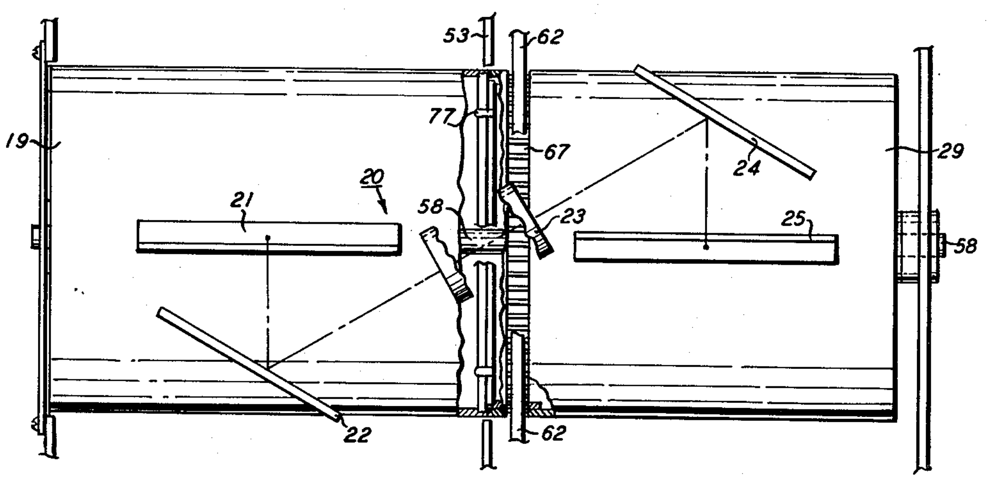
FIG. 6 is a plan view of the optical system removed from the apparatus.

A cleaner understanding of the operation of the xerographic apparatus and of the electrical circuit controlling the various elements can best be obtained by reference to the schematic wiring diagram illustrated in FIG. 7.

The first operation on starting the machine is for the operator to press the start button or switch SW–1. Upon closure of switch SW–1, the lamps LMP–1, LMP–2, LMP–3 and LMP–4, previously described, are energized, as is a lamp LMP–5 located behind the ON glass illustrated in FIG. 1 to indicate to the operator that the machine is energized.

At the same time, the corona generating devices 30 and 42 are energized through a high-voltage power supply PS and the motor M is energized to drive the brush 52 through belt 61 and through the reduction gears 59 to drive the timing belt 62 which engages pulley 67 mounted intermediate the xerographic drum 19 and the copier-carrier drum 29 to affect rotation of these elements. Solenoid SOL–1 is also energized through normally closed limit switch 1LS thereby disengaging ratchet 79 to effect coupling of the elements of slip clutch 63 to drive the paper feed mechanism through gears 80 and 81, the latter being fixed on shaft 82 which carries the drive roller 83 of endless conveyor 48.

Reproduction is initiated by first inserting a cut sheet of a support material 41 into slot 13. The sheet is grasped by conveyors 45 and 48 and is moved therebetween until the sheet actuates limit switch 1LS to de-energize solenoid SOL–1 and interrupt operation of the conveyors. Subsequently, an original to be reproduced is inserted through slot 11 to rolls 68 and 69 the latter of which is driven from contact with the copy drum. In passing therebetween the original actuates limit switch 2LS to energize a conventional electro mechanical timer TR for a preset period during which timer contacts TR–1, TR–2, TR–3 and TR–4 are closed. Closing contact TR–1, re-energizes SOL–1 to start the conveyors and the support surface held therebetween moving again, whereas closing contacts TR–2 and TR–3, respectively, energize fuser resistance element 51, and solenoid SOL–2 to effect operation of the developing apparatus 31. Contact TR–4 provides a holding circuit for timer TR after an original copy has completely passed over limit switch 2LS.

As SOL–2 is energized it releases ratchet 86 permitting conveyor drive-shaft 87 to be rotated through a clutch mechanism (not shown) similar to clutches 63 and 64, secured on the shaft 87. Shaft 87 is driven by gear 91 fixed thereon which engages gear 90 fixed on shaft 89. Shaft 89 is driven in timed relation to the rotation of the xerographic drum by means of belt 62 engaging pulley 88 fixed on shaft 89.

The original is fed by rolls 68 and 69 into contact with the carrier drum and then by the carrier drum cooperating with roller 69 below the platen 57 past the optical axis of optical system 20 whereby the image is projected through slit 28 into previously charged xerographic drum 29. Since both drums are rotated at identical rates a flowing image of the original is projected onto the xerographic plate.

After exposure, the electrostatic latent image formed on the surface of the xerographic drum is developed by the developing apparatus 31 and the powder image thus formed is transferred to the support material 41 on which the powder image is affixed by fuser 49.

With the system operative, and if in the opinion of the operator the reproductions are being produced with insufficiently dense images, toner material 35 can be added to the developing material 32 by operation of dial switch 15. When closed, switch 15 energizes solenoid SOL–3 to release ratchet 70 and permit engagement of clutch 64 mounted on shaft 92. Through a drive arrangement including gear 71 on shaft 92 and gear 72 on shaft 73 the cam 74 is rotated to effect reciprocation of rod 75 to operate toner dispenser 36 to dispense additional toner into the developing material 32.

After expiration of the operating period of timer TR, its contacts TR–1, TR–2, TR–3 and TR–4 are opened. Opening of contact TR–2 will de-energize the resistance element 51 of the fuser 49. Although contact TR–1 is opened the paper feed mechanism continues to operate through the normally closed limit switch 1LS which will close as the trailing edge of the sheet of support material passes thereover. In the preferred form of the invention the preset period of operation of timer TR is approximately 10 seconds to ensure complete ejection from the apparatus of both the original and the reproduction made on the support material.

Opening of contact TR–3 will de-energize solenoids SOL–2 and SOL–3 to discontinue operation of the developer mechanism 31 and the toner dispenser mechanism 36. Thus, as solenoid SOL–2 is de-energized, the spring loaded pall will engage ratchet 86 to effectively disengage the drive through the clutch mechanism to the developer apparatus 31. In the same manner, as solenoid SOL–3 is de-energized, its pall will engage ratchet 70 to uncouple the slip clutch 64 to stop the operation of the toner dispenser. Since contact TR–4 is open and the limit switch 2LS is opened as the trailing edge of a document is forwarded out of contact with this limit switch, the electromechanical timer TR is also de-energized.

At this time the operator can effect another reproducing cycle by again inserting a document into slot 11 and a sheet of support material into slot 13, or he may de-energize the remaining electrical components of the machine by opening the switch SW–1.

By the above description, there is disclosed an improved optical projection mechanism for use in a xerographic reproducing apparatus to effect synchronous movement of an original supported on a moving copy carrier, and a xerographic plate onto which the image of the original is projected by a folded optical system.

It is to be noted that for the purpose of illustration the apparatus is intended to effect substantially identical size reproductions of letter size documents or originals. Obviously, however, any size document or original could similarly be reproduced by dimensionally selecting the components. In addition, by employing, for example, appropriate relative drum diameters of any particular ratio in conjunction with an appropriate optical system, copy can be reproduced at increased or decreased magnification ratio relative to the original inversely coincident with the diameter raio of the copy drum to the xerographic drum.

While the invention has been described with reference to the structures disclosed herein, it is not confined to the details set forth, and this application is intended to cover such modifications or changes as may come within the purposes of the improvements or scope of the following claim.

What is claimed is:

In a xerographic reproducing apparatus the combination including a shaft journaled for rotation, a xerographic drum mounted on said shaft for rotation therewith, charging means positioned to apply a uniform electrostatic charge on said xerographic drum, a copy carrier drum mounted on said shaft adjacent said xerographic drum and operatively connected to said xerographic drum for rotation therewith, means operatively connected to and cooperating with said copy carrier drum for advancing a document to be reproduced on the peripheral surface of said copy carrier drum at a uniform lineal speed, said means including conveyor rolls operatively associted with and driven by said copy carrier drum for advancing a document to said copy carrier drum and a discharge conveyor means operatively associated with and driven by said copy carrier drum for discharging a document from said copy carrier drum, an optical system for projecting a radiation image of a document supported on said copy carrier drum onto the peripheral surface of the xerographic drum, developing means positioned to develop an electrostatic latent image on said xerographic drum, a first endless conveyor, a second endless conveyor positioned in cooperative relation to said first endless conveyor to advance a sheet of material to said xerographic drum, said second endless conveyor being driven by said first endless conveyor, transfer means positioned to effect transfer of a developed powder image from said xerographic drum to a sheet of support material, drive means connected to said xerographic plate and to said copy carrier drum to effect rotation of said xerographic drum and said copy carrier drum, said drive means including conveyor drive means operatively connectable to said first endless conveyor to drive said first endless conveyor at a lineal speed substantially equal to the lineal surface speed of said xerographic drum, first control means positioned in the path of movement of a document through said conveyor rolls to effect connection of said conveyor drive means to said first endless conveyor, and second control means positioned in the path of movement of a support material between said first endless conveyor and said second endless conveyor to disengage said conveyor drive means from said first endless conveyor.

References Cited in the file of this patent

UNITED STATES PATENTS

| | | |
|---|---|---|
| 1,801,450 | Owens | Apr. 21, 1931 |
| 2,930,284 | Limberger | Mar. 29, 1960 |
| 3,015,304 | Carlson et al. | Jan. 2, 1962 |
| 3,052,155 | Hurin et al. | Sept. 4, 1962 |
| 3,099,944 | Eichorn et al. | Aug. 6, 1963 |